United States Patent [19]
Jatteau

[11] 3,711,642
[45] Jan. 16, 1973

[54] CIRCUITRY FOR DISPLAYING ISODENSITY LINES IN AN IMAGE

[75] Inventor: Michel Rene Jatteau, Hauts de Seine, France

[73] Assignee: North American Philips Co. Inc., New York, N.Y.

[22] Filed: Sept. 25, 1968

[21] Appl. No.: 762,480

[30] Foreign Application Priority Data

Sept. 26, 1967 France..............................67122249

[52] U.S. Cl.................................................178/6.8
[51] Int. Cl..............................................H04n 5/14
[58] Field of Search........178/6, 6.8, 7.1, 7.2, DIG. 1, 178/DIG. 8, DIG. 5

[56] References Cited

UNITED STATES PATENTS 2,962,548  11/1960  Taudt.....................................178/6.6
3,005,045  10/1961  Shanahan..............................178/6.8
3,354,266  11/1967  Dinenno.................................178/6.8

Primary Examiner—Robert L. Richardson
Attorney—Frank R. Trifari

[57] ABSTRACT

A device for displaying isodensity lines of a radiation image on a CRT includes a radiation detector that provides a video signal that varies with the scanned radiation. A selector responsive to the video signal supplies first and second output signals. The first output signal is limited to a range between a given minimum and a given maximum value of the input signal and the second output signal is limited to a minimum value equal to the given maximum value of the input signal. The two output signals are subtractively combined and the resultant signal is applied to the control electrode of the CRT to vary the beam intensity.

11 Claims, 5 Drawing Figures

INVENTOR.
MICHEL R. JATTEAU

INVENTOR.
MICHEL R. JATTEAU

BY

*Frank R. Trifari*

AGENT

CIRCUITRY FOR DISPLAYING ISODENSITY LINES IN AN IMAGE

This invention relates to a device for displaying isodensity lines on the screen of a display tube, and more particularly to a device comprising a radiation detector for collecting the radiations of the various portions of the image to be captured, a plurality of amplifying stages to which the output signal of said detector is applied, a selector which selects the signal variations corresponding to the isodensity line to be displayed and supplies them to a control-electrode of a display tube for varying the brightness on the screen of said tube.

In many cases it is desirable with a given image, for example, an X-ray image, a radioactive image or a temperature image, to select lines of equal intensity, the so-called isodensity lines. In particular, in a temperature image emitting infrared rays, the isodensity lines are termed isotherms. In the latter case the radiation detector is an infrared detector which sequentially scans the radiations of the various parts of the image by means of opto-electrical or opto-mechanical scanning members and converts them into electrical signals.

The detector is usually connected to a display tube, for example, of the cathode-ray type, by means of a series of amplifying stages. On the screen of this tube, the deflection members of which are controlled in synchronism with the scanning members associated with the detector, there appears an image whose brightest parts correspond to the hottest parts of the explored field, whereas the coldest regions of said fields are displayed on the screen with lower brightness.

There may occur very great temperature differences between the various parts of the scanned field. For a satisfactory analysis of the image it is desirable to be able to localize simultaneously all points of the image associated with the same observation temperature, that is to say, to have the curves or isothermal zones put into evidence around said temperature and it is also desirable to be able to vary and to choose at will the value of this observation temperature.

In U.S. Pat. No. 3,441,667 there is described a device in which such isothermal curves are traced on the screen of the cathode-ray tube by deriving from a point in the series of amplifying stages a "checking" signal corresponding to a given voltage level at said point. This checking signal is applied to the display tube to produce an instantaneous increase of the brightness of the spot displayed on said screen. The isotherm then appears as a bright line on said screen. The choice of the observation temperature to which the isotherm thus traced corresponds is based on the choice of the voltage level to which the checking signal corresponds.

In a device of this kind it is difficult to obviate the following drawbacks: the path of the isotherms is likely to be changed by any variations of the operational conditions of the amplifying stages preceding the point where the checking signal is derived, which variations may be produced particularly by high amplitudes of the signals applied to said stages.

The noise of the detector is inconveniently increased each time when the selected observation temperature corresponds to a working point of the detector fairly remote from its optimum working point, which thereby affects the accuracy of the path.

The present invention obviates these disadvantages in a particularly simple manner and is characterized in that said selector comprises a first limiting member which supplies a first signal, the minimum value of which lies at a preselected lower level $n_i$ and the maximum value of which lies at a preselected upper level $n_s$ of the input signal. There is further provided a second limiting member for supplying a second output signal, the minimum value of which lies at the preselected upper level $n_s$ of the input signal. The two output signals are subtraced in a further stage prior to the application to said control-electrode of the display tube.

With reference to the schematic accompanying FIGS. 1 to 3, there will be described an embodiment, given by way of non-limiting example, of a device for tracing the isotherms in an optical detecting apparatus by infrared rays according to the invention. The means used for carrying out this invention and to be described hereinafter with reference to said embodiment have to be considered to form part of the invention, it being understood that any equivalent means may also be employed within the scope of the invention.

The FIGS. only show the elements required for a good understanding of the invention, while the corresponding elements of said Figures are designated by the same reference numerals. These Figures show:

FIG. 1 while a concise diagram of the device according to the invention,

Figure 1:
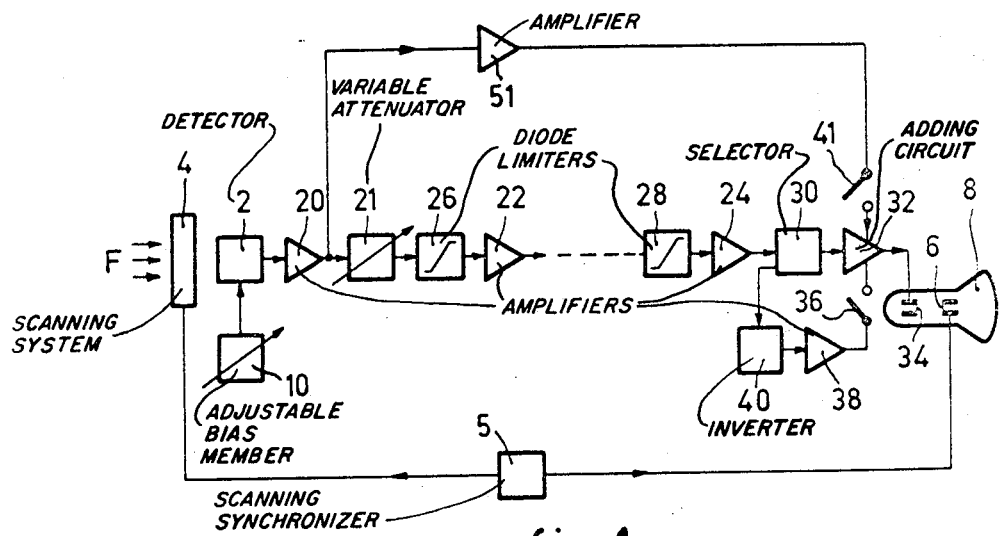

FIG. 1 shows a point detector 2, for example, a photovoltaic cell or a photo-conductive cell, which receives the radiation F of the object to be examined through an opto-mechanical scanning system 4. In the case of a temperature image the radiation F is infrared radiation and in the case of a radioactive image it is radio-active radiation. The scanning system 4 is controlled by the same circuit 5 as the deflection members 6 of the display tube 8 so that, as is known, synchronism of the analysis of the object and the image is ensured. The detector 2 is provided with a polarization varying member 10, which is a bias adjusting member that determines the DC level of the video signal. Charging the DC bias makes it possible to select different contour levels in the signal to be displayed. The biasing member 10 is capable of shifting, parallel to itself, the assembly of the characteristic curve representing the variation of the output level of the detector as a function of its exposure. If the detector is a photo-voltaic cell, said varying member may simply be a source of variable supply voltage. If the detector is a photo-conductive cell, this is not possible since a detector of this type has optimum properties for a given polarizing current which is generally too high for use as an input reference value. It is therefore necessary to use a differential circuit or a compensation circuit which permits of arranging the variations of the output signal around a fixed reference level, for example, the zero level.

Figure 2:
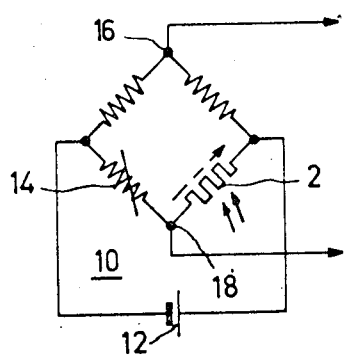
FIG. 2 shows the diagram of a polarization varying member.

The photo-conductive detectors may be included in a Wheatstone bridge (FIG. 2) supplied by a source of stabilized direct voltage 12 for a given value of the incoming radiation via a variable resistor 14. The output signal is derived between the terminals 16 and 18 of the bridge.

FIG. 1 furthermore shows a linear amplifier 20 that is non-saturable for all possible levels of the output signal of the detector 2. The amplifier 20 is in cascade with a variable attenuator 21 and a series of amplifying stages, such as amplifiers 22 and 24, which may be so-called operational amplifiers, which means that they have a high amplification and are provided each with a feedback circuit reducing and stabilizing this amplification.

Each of these amplifier stages 22 and 24 is preceded by a known limiting member 26 and 28, respectively, comprising diodes which limit the input signal of the amplifier to an extent such that, regardless of the amplitude of the signal at the input of the limiting member the, amplifier is prevented from being saturated. All these elements, in principle, pass the D.C. component of the signal or at least they include D.C. restoring circuits.

The signal thus amplified and limited in amplitude arrives at the selector 30, which defines a narrower passage with respect to the output signal of the detector 2 between two voltage levels, i.e. a lower level $n_i$ and an upper level $n_s$, than the passage defined by the limiting member 28, which passage itself is narrower than the passage defined by the preceding limiting member 26. There is a possibility of omitting the limiting members 26 and 28 by disposing the selector 30 in front of the amplifying stage 22. However, electronic selection of voltage levels can be carried out more easily subsequent to the amplification of the signals than it can at low signal levels. In addition, the device described herein permits of using a variation of the amplification of the amplifier chain instead of using a less easy variation of the selection thresholds $n_i$ and $n_s$ for controlling the width of the selected level passage.

This variation of the amplification is obtained by the attenuator 21, by means of which the width of the temperature interval maintained can be controlled and which can be calibrated in temperature difference values. The mean temperature observed is controlled by the polarization varying member 10, which may be calibrated in units of temperature. The output signals of the detector 2, employed for tracing the isotherms, that is to say the signals selected at selector 30 are therefore distributed around a level constant in time. By choosing this level equal to the level of the optimum signal-to-noise ratio of the detector in the construction of the apparatus, the influence of noise on the path of the isotherms is minimized irrespective of the mean temperature observed.

Figure 4:
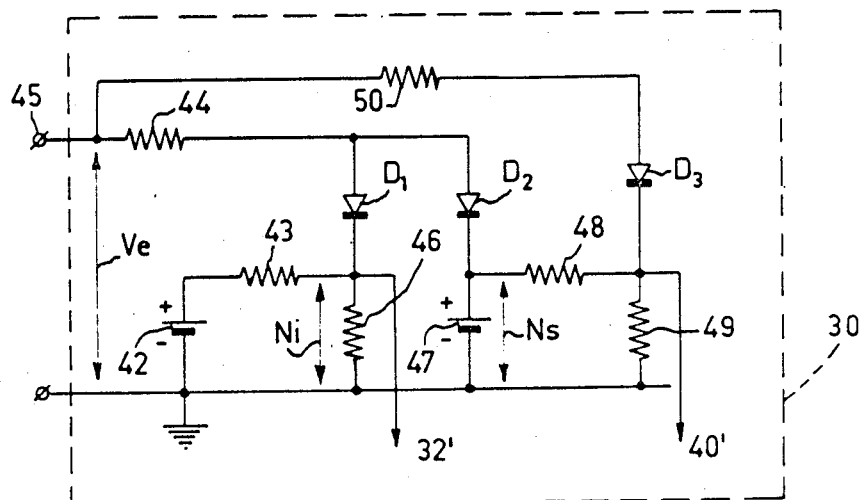
FIG. 4 shows a possible embodiment of a level selector of the kind shown in FIG. 1.

The selector 30 may be of the construction illustrated in FIG. 4. It comprises a first D.C. voltage source 42 supplying a positive direct voltage with respect to ground corresponding to the lower voltage level $n_i$ to be selected. The source 42 is connected through a resistor 43 to the cathode of a first diode $D_1$, the anode of which is connected through an input resistor 44 to the input terminal 45. Terminal 45 is connected to the amplifier 24. The cathode of the diode $D_1$ is connected through an output resistor 46 to ground and, moreover, via the output terminal 32' to a first input of the amplifying and adding stage 32. The anode of the diode $D_1$ is furthermore connected to the anode of a second diode $D_2$, the cathode of which is connected to a second D.C. voltage source 47, which supplies a positive direct voltage with respect to ground corresponding to the upper voltage level $n_s$ to be selected.

The source 47 is furthermore connected through a resistor 48 to the cathode of a third diode $D_3$, the anode of which is connected through a further input resistor 50 to the input terminal 45. The cathode of the diode $D_3$ is connected to ground via the resistor 49 and is furthermore connected through the output terminal 40' to an input of the inverter 40.

The selector 30 operates as follows. As long as the input signal $V_e$ from the amplifier 24, illustrated in FIG. 3a, lies below the voltage level $n_i$, the three diodes $D_1$, $D_2$ and $D_3$ are cut off. The signal at the terminal 32' of FIG. 4 thereof assumes the level $n_i$ and the terminal 40' is at the level $n_s$. At the instant $t_1$, when the input signal $V_e$ exceeds the voltage level $n_i$, but remains below the voltage level $n_s$ (period $t_1$ to $t_2$), the diode $D_1$ becomes conducting, whereas the diodes $D_2$ and $D_3$ remain cut off. The signal at the terminal 32' therefore follows the input signal $V_e$ and assumes in the period $t_1$ to $t_2$, when the waveform illustrated in FIG. 3b. At the instant $t_2$ the input signal $V_e$ exceeds the voltage level $n_s$, the diodes $D_2$ and $D_3$ also begin to conduct. Since the cathode of the diode $D_2$ is connected directly to the source 47, the voltage at the terminal 32' remains at the level $n_s$ so that the signal at the terminal 32 will assume in the period $t_2$ to $t_3$ the waveform illustrated in FIG. 3b.

In the period $t_2$ to $t_3$ the signal at the terminal 40' will follow the input signal. The output signal at the terminal 40 is phase-inverted in the inverter 40 and amplified in the amplifier 38 so that its waveform will be that illustrated in FIG. 3c.

After the instant $t_3$ the diodes $D_2$ and $D_3$ are again cut off. The signal at the terminal 40' attains the value $n_s$ and the signal at the terminal 32' follows the input signal. After the instant $t_4$ the input signal drops below the voltage level $n_i$ so that the diode $D_1$ is again cut off and the signal at the terminal 32' maintains the value $n_i$.

Figure 3:
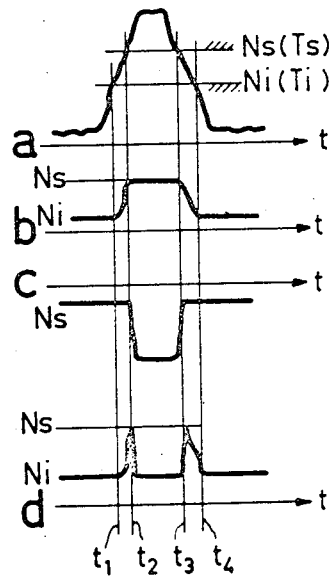
FIG. 3 illustrates the variations of electrical signals as a function of time.

When the switch 36 is closed and the switch 41 is open, the signals illustrated in the FIGS. 3b and 3c appear at the respective inputs of the amplifying and adding stage 32. These signals are added so that at the output of the stage 32 a signal of the waveform shown in FIG. 3d is obtained. For example, by means of clamping circuits in the amplifier 32 it should be ensured, however, that the voltage level $n_s$ (see FIGS. 3b and 3c) remains at the same value. This is necessary because the two signals reach the amplifier 32 by different paths where so that the voltage level $n_s$ of the signal of FIG. 3b may shift relative to the voltage level $n_s$ of the signal of FIG. 3c.

Figure 5:
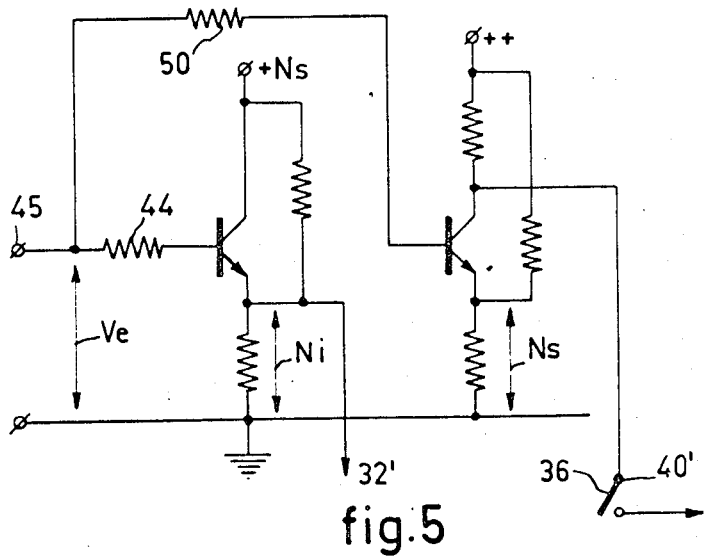
FIG. 5 shows a second possible embodiment of such a selector.

Although the embodiment shown in FIG. 4 comprises a very simple and effective selector 30, other selector constructions are obviously also possible. The first limiting member may be formed by an emitter follower, the emitter being at the level $n_i$ by way of a voltage divider and the collector being at the level $n_s$. The second limiting member may also be formed by a transistor, the emitter of which is connected to a voltage level $n_s$, while the output signal is derived from the collector. This second transistor provides at the same time the signal inversion so that the stage 40 and, as the case may be, also the stage 38 may be dispensed with. Such a construction is shown in FIG. 5. The output signal is applied to the control-electrode 34, for example, the Wehnelt cylinder, which controls the brightness of the spot point produced on the screen of the display tube 8. When the switch 41 is open, the image of the points of the object having a temperature below the observation temperature interval is dark, whereas the image of the points having a temperature within this interval is variable and the image of the points having a temperature above said interval is very bright. The selected isotherm appears with average brightness.

However, as is described in the aforesaid U.S. Patent, it is also desired to render the normal video signal visible on the screen of the display tube 8. This is achieved by closing not only the switch 36 but also the switch 41. The non-amplified video signal is then amplified in the amplifier 51 to the desired level and added in the counting stage 32 to the signals of FIGS. 3b and 3c, which means virtually the addition of the signal of FIG. 3d to the non-processed video signal. In fact, a pulsatory signal (FIG. 3d) defining the isotherm or the isodensity line is added to the video signal so that the observer can trace an isodensity line in the normal image. By opening the switch 41 only the isodensity line will be made visible.

Although in the foregoing a device is described which is capable of rendering visible only one isodensity line, it will be obvious that by doubling or trebling the terminals 21 to 32 and 36 to 40 more isodensity lines can be rendered visible at the same time.

It will moreover be obvious that, although the arrangement of FIG. 4 is described for a positive going signal, the same principle applies to a negative going signal. In this case the polarities of the voltage sources 42 and 47 and the modes of connection of the diodes $D_1$, $D_2$ and $D_3$ have to be reversed.

What is claimed is:

1. A device for displaying isodensity lines of a radiation image on the screen of a display tube comprising, a radiation detector for collecting the radiation from the various parts of the object to be examined and generating a signal that varies therewith, a plurality of amplifying stages to which the output signal of said detector is applied, a display tube having a display screen and a control electrode for varying the intensity of the image on the screen, a selector in cascade with the amplifying stages for selecting the signal variations corresponding to the isodensity line to be displayed, said selector comprising a first limiting member supplying a first output signal the minimum value of which lies at a given lower signal level $n_i$ and the maximum value of which lies at a given upper signal level $n_s$ of the input signal and a second limiting member supplying a second output signal the minimum value of which lies at the given upper signal level $n_s$ of the input signal, and means for subtractively combining the two output signals of the selector and applying the resultant signal to said control-electrode of the display tube.

2. A device as claimed in claim 1 wherein the first limiting member of the selector includes a first diode and a second diode, a first input resistor, means for applying the input signal to the selector through said first input resistor to similar electrodes of the two diodes, means for biassing the other electrode of the first diode through an output impedance at the given lower level $n_i$, means directly biassing the other electrode of the second diode at the given upper level $n_s$, a first selector output terminal connected to said first diode other electrode, the second limiting member including a third diode, a second input resistor, means for applying the selector input signal through said second input resistor to a first electrode of the third diode which is identical with the similar electrodes of the first and second diodes of the first limiting member, means for biassing the other electrode of said third diode through an output impedance at the given upper level $n_s$, and a second selector output terminal connected to said third diode other electrode.

3. A device as claimed in claim 2 characterized in that the output impedance of the first limiting member comprises two resistors, means connecting one end of each of said two resistors to the other electrode of the first diode, a source of direct voltage for supplying the bias voltage for the given lower signal level $n_i$, means connecting the other end of one resistor to one terminal and the other end of the other resistor to the other terminal of said direct-voltage source, the output impedance of the second limiting member comprising two further resistors, means connecting one end of each of said two further resistors to the other electrode of the third diode, a second source of direct voltage for supplying the bias voltage for the given upper signal level $n_s$, means connecting the other end of one resistor of said two further resistors to one terminal and the other end of the other resistor to the other terminal of said second direct voltage source, and means directly connecting said one terminal of the second direct-voltage source to the other electrode of the second diode.

4. A device as claimed in claim 1 characterized in that the total gain of the amplifying stages preceding the selector is controllable to produce a variable amplitude output signal from the selector.

5. A device as claimed in claim 1 further comprising at least one diode clipper connected to prevent saturation of the amplifying stages.

6. A device as claimed in claim 1 wherein said display tube is a cathode ray tube having electron beam deflection means, said device further comprising means for scanning the object field and sequentially supplying the scanned radiation to the detector, means for adjusting the bias level of the detector, means for controlling the tube deflection means in synchronism with the scanning means, a non-saturable amplifier and a variable attenuator connected in cascade between the detector and the amplifying stages, a clipper stage preceding each amplifying stage to prevent saturation thereof, a signal inverter connected in parallel with the selector, and a switch for rendering said inverter inactive.

7. A device as claimed in claim 6 wherein said detector includes a photoconductive cell and said bias adjusting means comprises a Wheatstone bridge having a variable resistor in one branch and said cell in a second branch, and a source of voltage connected to the input terminals of the bridge.

8. A device for displaying a radiation image on the screen of a display tube with emphasis on a selected radiation concentration level comprising, radiation sensitive scanning means for generating a video signal that varies with the radiation scanned, means connected to said scanning means for amplifying said signal, a selector having an input coupled to the output of the amplifying means and first and second output terminals, said selector including first and second limiting means connected between the input terminal and said first and second output terminals and arranged to develop first and second output signals at said first and second output terminals, respectively, the first output signal being limited to a range of signal values between a given minimum value and a given maximum value of the selector input signal and the second output signal being limited to a minimum value equal to said given maximum value of the input signal, and means for substractively combining said first and second output signals and supplying the resultant signal to a control electrode of the display tube thereby to vary the intensity of the image on the tube screen.

9. A device as claimed in claim 8 wherein said display tube is a cathode ray tube having electron beam deflection means, said device further comprising means for controlling the tube deflection means in synchronism with the scanning means, an amplifier connected to the output of said scanning means, and a switch for selectively connecting said amplifier to said combining means whereby the video signal is combined with said first and second output signals and supplied to the control electrode of the display tube for simultaneously displaying the video signal and the selected radiation level.

10. A device as claimed in claim 9 wherein said combining means comprises an adding circuit having a first input connected to the first output terminal of the selector and a second input, and an inverter amplifier and a switch connected in series between the second output terminal of the selector and the second input of the adding circuit.

11. A device as claimed in claim 9 further comprising a source of variable bias voltage connected to the video signal generating means for adjusting the DC level of said video signal.

* * * * *

UNITED STATES PATENT OFFICE
CERTIFICATE OF CORRECTION

Patent No. 3,711,642             Dated    January 16, 1973

Inventor(s)   MICHEL RENE JATTEAU

It is certified that error appears in the above-identified patent and that said Letters Patent are hereby corrected as shown below:

ON THE TITLE PAGE cancel "67122249" and insert -- 122.249 --;

Signed and sealed this 12th day of February 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,711,642　　　　　　　　Dated January 16, 1973

Inventor(s) MICHEL RENE JATTEAU

It is certified that error appears in the above-identified patent and that said Letters Patent are hereby corrected as shown below:

col. 1, line 9, before "a" insert -- and --;

col. 4, line 32, change "32" to -- 32' --;

line 36, change "40" (1st occurrence) to -- 40' --;

col. 5, line 35, cancel "terminals" and insert -- elements --;

Signed and sealed this 19th day of November 1974.

(SEAL)
Attest:

McCOY M. GIBSON JR.　　　　　　　C. MARSHALL DANN
Attesting Officer　　　　　　　　Commissioner of Patents